United States Patent
Roy et al.

(10) Patent No.: US 9,177,289 B2
(45) Date of Patent: Nov. 3, 2015

(54) ENHANCING ENTERPRISE SERVICE DESIGN KNOWLEDGE USING ONTOLOGY-BASED CLUSTERING

(75) Inventors: Marcus Roy, Cremorne NSW (AU); Nicholas Alexander Wittstruck, Wallenhorst (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 13/463,053

(22) Filed: May 3, 2012

(65) Prior Publication Data

US 2013/0297617 A1 Nov. 7, 2013

(51) Int. Cl.
*G06F 17/30* (2006.01)
*G06Q 10/10* (2012.01)
*G06N 5/02* (2006.01)

(52) U.S. Cl.
CPC . *G06Q 10/10* (2013.01); *G06N 5/02* (2013.01)

(58) Field of Classification Search
CPC ............... G06F 17/30864; G06F 17/30722
USPC ........................................................ 707/748
See application file for complete search history.

(56) References Cited

U.S. PATENT DOCUMENTS

| | | | |
|---|---|---|---|
| 5,600,775 A | 2/1997 | King | |
| 6,684,218 B1 * | 1/2004 | Santos et al. | 1/1 |
| 7,124,093 B1 | 10/2006 | Graham et al. | |
| 7,225,199 B1 * | 5/2007 | Green et al. | 1/1 |
| 7,496,912 B2 | 2/2009 | Keller et al. | |
| 7,526,425 B2 | 4/2009 | Marchisio et al. | |
| 7,757,276 B1 * | 7/2010 | Lear | 726/6 |
| 7,844,612 B2 | 11/2010 | Colgrave et al. | |
| 8,478,722 B2 | 7/2013 | Lee et al. | |
| 8,548,938 B2 | 10/2013 | Amaru et al. | |
| 2005/0021490 A1 | 1/2005 | Chen et al. | |
| 2006/0074980 A1 | 4/2006 | Sarkar | |
| 2006/0117073 A1 | 6/2006 | Bosworth et al. | |
| 2006/0271563 A1 * | 11/2006 | Angelo et al. | 707/100 |
| 2006/0277166 A1 | 12/2006 | Vogler-Ivashchanka et al. | |
| 2007/0033221 A1 | 2/2007 | Copperman et al. | |
| 2007/0073736 A1 | 3/2007 | Goetz | |
| 2007/0162482 A1 | 7/2007 | Flaxer et al. | |

(Continued)

FOREIGN PATENT DOCUMENTS

EP 542430 A2 5/1993

OTHER PUBLICATIONS

J. Beaton et al., "Usability challenges for Enterprise Service-oriented Architecture APIs," 2008 IEEE Symposium on Visual Languages and Human-Centric Computing, VL/HCC'09, Sep. 2008, Corvallis, Oregon, USA, pp. 193-196.

(Continued)

*Primary Examiner* — Mariela Reyes
*Assistant Examiner* — Courtney Harmon
(74) *Attorney, Agent, or Firm* — Fish & Richardson P.C.

(57) ABSTRACT

Methods, systems, and computer-readable storage media for extending a knowledge base, implementations including receiving an enterprise service signature (ESS) associated with an enterprise service (ES), the ESS being stored in a computer-readable repository, segmenting the ESS to provide a segmented ESS, identifying one or more unknown terms from the segmented ESS, determining that at least one unknown term of the one or more unknown terms comprises at least one of a specialization and a new entity, and extending the knowledge base in view of the at least one of the specialization and the new entity.

14 Claims, 7 Drawing Sheets

(56) References Cited

U.S. PATENT DOCUMENTS

| | | | |
|---|---|---|---|
| 2008/0201355 | A1 | 8/2008 | Bloesch et al. |
| 2008/0301625 | A1 | 12/2008 | Cook et al. |
| 2009/0012778 | A1 | 1/2009 | Feng et al. |
| 2009/0024561 | A1 | 1/2009 | Palanisamy |
| 2009/0083058 | A1 | 3/2009 | Beringer et al. |
| 2009/0106744 | A1 | 4/2009 | Li et al. |
| 2009/0164497 | A1 | 6/2009 | Steinmaier et al. |
| 2009/0244877 | A1 | 10/2009 | Yeh et al. |
| 2009/0256586 | A1 | 10/2009 | Oguri |
| 2010/0010974 | A1 | 1/2010 | Chieu et al. |
| 2010/0023445 | A1 | 1/2010 | Feaver et al. |
| 2010/0070448 | A1* | 3/2010 | Omoigui .................. 706/47 |
| 2010/0094835 | A1 | 4/2010 | Lu et al. |
| 2010/0114629 | A1 | 5/2010 | Adler et al. |
| 2010/0161580 | A1 | 6/2010 | Chipman et al. |
| 2010/0169134 | A1 | 7/2010 | Cheng et al. |
| 2010/0191758 | A1 | 7/2010 | Peng et al. |
| 2010/0211924 | A1 | 8/2010 | Begel et al. |
| 2011/0029479 | A1 | 2/2011 | Novak et al. |
| 2011/0035650 | A1 | 2/2011 | Jardine-Skinner et al. |
| 2011/0040766 | A1 | 2/2011 | Robinson et al. |
| 2011/0106801 | A1 | 5/2011 | Srivastava et al. |
| 2011/0131247 | A1 | 6/2011 | Brown et al. |
| 2011/0231365 | A1 | 9/2011 | Bahl et al. |
| 2011/0295847 | A1 | 12/2011 | Cucerzan et al. |
| 2011/0320479 | A1 | 12/2011 | Burris et al. |
| 2012/0124547 | A1 | 5/2012 | Halbedel |
| 2012/0143867 | A1 | 6/2012 | Roy et al. |
| 2012/0304174 | A1 | 11/2012 | Arnold et al. |

OTHER PUBLICATIONS

J. Beaton et al., "Usability evaluation for Enterprise SOA APIs," 2nd International Workshop on Systems Development in SOA Environments, (SDSOA 2008), Co-located with ICSE 2008, Leipzig, Germany, May 12, 2008. pp. 29-34.

SAP, "Governance for Modeling and Implementing Enterprise Services at SAP," SAP SDN Community, Apr. 2007, Walldorf, Germany, retrieved from www.sdn.sap.com/irj/scn/go/portal/prtroot/docs/library/uuid/f0763dbc-abd3-2910-4686-ab7adfc8ed92?QuickLink=index&overridelayout=true, 28 pages.

SAP, "PI Best Practices: Modeling," SAP SDN Community, May 2009, retrieved from www.sdn.sap.com/irj/scn/go/portal/prtroot/docs/library/uuid/303856cd-c81a-2c10-66bf-a4af539b8a3e?QuickLink=index\&overridelayout=true, 30 pages.

X. Dong et al., "Similarity Search for Web Services," Proceedings of the 30th International Conference on Very Large Data Bases (VLDB), Aug. 29-Sep. 3, 2004, Toronto, Canada, pp. 372-383.

M. Stollberg et al., "Two-Phase Web Service Discovery Based on Rich Functional Descriptions," 4th European Semantic Web Conference (ESWC), Jun. 2007, Innsbruck, Austria, pp. 99-113.

N. Steinmetz et al., "Web Service Search on Large Scale," International Conference on Service Oriented Computing (ICSOC) 2009, Nov. 2009, Stock-holm, Sweden, pp. 437-444.

E. Toch et al., "OPOSSUM: Bridging the gap between Web Services and the Semantic Web," The 6th Conference on Next Generation Information Technologies and Systems (NGITS'2006), Jul. 4-6, 2006, pp. 357-358.

P. Kungas et al., "Cost-Effective Semantic Annotation of XML Schemas and Web Service Interfaces," 2009 IEEE International Conference on Services Computing, Sep. 2009, pp. 372-379.

K. Quinn, "Not Everyone Who Drives a Car Fixes It Themselves," Information Management, Nov. 10, 2005, retrieved from www.information-management.com/news/1041222-1.html, 11 pages.

F.A. Grootjen et al., "Conceptual query expansion," Data & Knowledge Engineering, vol. 56, No. 2, Feb. 2006, pp. 174-193.

E. Hyvönen et al., "Ontogator: Combining View- and Ontology-Based Search with Semantic Browsing," Proceedings of XML Finland 2003, Open Standards, XML, and the Public Sector, Kuopio, Oct. 30-31, 2003, 16 pages.

W. Fang et al., "Toward a Semantic Search Engine Based on Ontologies," Proceedings of the Fourth International Conference on Machine Learning and Cybernetics, Guangzhou, Aug. 2005, pp. 1913-1918.

A. Burton-Jones et al., "A Heuristic-Based Methodology for Semantic Augmentation of User Queries on the Web," 22nd International Conference on Conceptual Modeling (ER 2003), Oct. 2003, pp. 476-489.

E. Kapetanios et al., "Simplifying Syntactic and Semantic Parsing of NL-based Queries in Advanced Application Domains," Data & Knowledge Engineering, vol. 55, Nr. 1, Oct. 2005, pp. 38-58.

Jordi Conesa et al., "Improving web-query processing through semantic knowledge," *Data & Knowledge Engineering*, vol. 66, No. 1, Jul. 2008, pp. 18-34.

Marcus Roy et al., "Facilitating Enterprise Service Discovery for Non-technical Business Users," Proceedings of the 8th International Conference on Service Oriented Computing, ICSOC'10, Dec. 2010, pp. 100-110.

H.H. Hoang et al., "The State of the Art of Ontology-based Query Systems: A Comparison of Existing Approaches," Proceedings of the IEEE International Conference on Computing & Informatics (ICOCI 2006), Jun. 2006, 6 pages.

Jens Hartmann et al., "Ontology-Based Query Refinement for Semantic Portals," *From Integrated Publication and Information Systems to Information and Knowledge Environments*, LNCS 3379, 2005, pp. 41-50.

B. Aleman-Meza et al., "Ranking Documents Semantically Using Ontological Relationships," 2010 IEEE Fourth International Conference on Semantic Computing, Sep. 2010, pp. 299-304.

Falk Brauer, "Graph-based Concept Identification and Disambiguation for Enterprise Search," Proceedings of the 19th International Conference on World Wide web, WWW'10, May 1-5, 2001, pp. 171-180.

Marcus Roy et al., "Using SOA Governance Design Methodologies to Augment Enterprise Service Descriptions," Proceedings of the 23rd International Conference on Advanced Information Systems, CAiSE'11, Jun. 20-24, 2011, pp. 566-581.

Bruce W. Watson, "A New Algorithm for the Construction of Minimal Acyclic DFAs," *Science of Computer Programming*, vol. 48, Issue 2-3, Aug.-Sep. 2003, pp. 81-97.

Marcus Roy et al., "Extending Enterprise Service Design Knowledge using Clustering," Proceedings of the International Conference on Service Orientated Computing, ICSOC 2012, Nov. 12-15, 2012, 15 pages.

Yonggang Qiu et al., "Concept Based Query Expansion," Sigir Forum, ACM, New York, NY, US, Spec. Issue, Jun. 27, 1993, 10 pages.

Jason J. Jung, "Service chain-based business alliance formation in service-oriented architecture," Expert Systems with Applications, vol. 38, No. 3, Mar. 1, 2011, pp. 2206-2211.

European Search Report for European Patent Application No. 12007449.7, dated Apr. 17, 2013, 8 pages.

* cited by examiner

ENHANCING ENTERPRISE SERVICE DESIGN KNOWLEDGE USING ONTOLOGY-BASED CLUSTERING

BACKGROUND

Enterprise services (ES) provide programmatic access to an immense, and already existing, pool of business data and functionality provided by large enterprise applications. Example enterprise applications include Enterprise Resource Planning (ERP) and Customer Relationship Management (CRM) applications. The reuse of ES enables rapid, agile and cost-effective development of composite applications. ES can represent highly-integrated web services that access defined business data and logic of existing business processes. As such, they differ significantly in quantity and complexity from regular Web Services (e.g. advertising application program interfaces (APIs)) due to applied governance and sustainability constraints.

Searching a repository of ES can be difficult due to the syntactical nature of service definitions and missing meaning that is required to successfully find ES. In some cases, ES are more intricate as a result of the complexity of business process and application functionality that they represent. Consequently, traditional ES discovery targets developers that have the required technical skills to understand service definitions. In contrast, business users have detailed knowledge of business processes, but no or little technical background. Given that ESs are defined at a business level based on existing business requirements, business users naturally qualify as users that would search for ESs.

SUMMARY

Implementations of the present disclosure include computer-implemented methods for extending a knowledge base. In some implementations, methods include receiving an enterprise service signature (ESS) associated with an enterprise service (ES), the ESS being stored in a computer-readable repository, segmenting the ESS to provide a segmented ESS, identifying one or more unknown terms from the segmented ESS, determining that at least one unknown term of the one or more unknown terms includes at least one of a specialization and a new entity, and extending the knowledge base in view of the at least one of the specialization and the new entity.

In some implementations, determining that the at least one unknown term comprises at least one of a specialization and a new entity includes: determining one or more relationship measures associated with the at least one unknown term, and identifying the at least one unknown term as a specialization or a new entity.

In some implementations, the relationship measures include a cohesion value and a correlation value.

In some implementations, the relationship measures are each determined based on known terms associated with one or more other ESSs.

In some implementations, identifying the at least one unknown term as a specialization or a new entity includes: combining the cohesion value and the correlation value into a single score based on a ranking function, and comparing the single score to one or more threshold scores, wherein whether the at least one unknown term is a specialization or a new entity is based on the comparing.

In some implementations, combining the cohesion value and the correlation value into a single score is further based on a kernel function, the kernel function providing an approximation of ranking behavior.

In some implementations, extending the knowledge base includes appending one or more nodes to a metadata graph associated with the ES.

In some implementations, extending the knowledge base includes automatically generating an automata based on the at least one unknown term, the automata representing a naming convention of an ES.

In some implementations, the at least one unknown term is a specialization and automatically generating the automata includes appending a new transition to a pre-defined automata.

In some implementations, the new transition is appended to be parallel to an existing transition provided in the pre-defined automata.

In some implementations, the at least one unknown term is a new entity and automatically generating the automata includes appending a new state and one or more associated transitions to a pre-defined automata.

In some implementations, the new state is appended to be serial to one or more existing states provided in the pre-defined automata.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to extending a knowledge base of entities and automatically generating automata that represent naming conventions of entities. In some examples, enterprise services (ESs) associated with respective enterprise service signatures (ESSs) incorporate entities. In some examples, entities include terms that are provided in an ESS. In some examples, extension of the knowledge base and automatic generation of automata is based on one or more unknown terms provided in an ESS. More particularly, implementations are directed to improving the detection of existing, related or new entities to facilitate the creation of a precise and complete knowledge base. In some implementations, complete entities are matched with known entities and clustering techniques are used to identify one or more of a new entity and a specialization of an existing entity. The knowledge base can be extended to include the new entity and/or the specialization and the automata can be automatically generated to include the new entity and/or the specialization. In this manner, the precision of ES search, which can be executed using the knowledge base and the automata, can be improved.

In some implementations, a hybrid approach is provided for entity recognition and knowledge learning based on ontology-based clustering. In particular, implementations of the present disclosure improve the accuracy of ES search results by extending a knowledge base and generating automata in a mainly unsupervised fashion. In some implementations, a clustering technique based on ranking is provided and a decision function is used to identify unknown terms as independent entities or specializations of known entities, which can be added to the knowledge base.

In some examples, an ES is a callable entity that provides business functionality and is published in an enterprise services repository (ESR). ESs are structured according to a harmonized enterprise model based on process components, and business objects, among others. In some implementations, ESs are well documented, safeguard quality and stability and are based on open standards. An ES can be developed in accordance with a governance process, the development providing one or more artifacts, discussed in further detail below. An example governance process includes mandatory modeling and implementation guidelines for each new ES development, a special review process having a plurality of quality gates, and regularly executed manual and automated tests for each service operation to safeguard functional correctness.

In some implementations, ES development can follow a top-down approach beginning with the identification of business requirements down to the definition of the service structure. This stands in contrast to a bottom-up approach, which exposes application program interfaces (APIs) of existing ESs as web services. As a consequence, ESs can be based on description models, guidelines and in-house conventions to ensure governance compliance. ES developers are given documents that define this information. These documents are referred to as artifacts. In some implementations, artifacts can be explicitly manifested as documents and/or can be implicitly manifested in the form of existing knowledge residing within developers. These artifacts are recurrently applied during the ES development process.

In some implementations, an ESS can be associated with each ES. More particularly, an ES is a callable service that includes a name or identifier. The name/identifier of the ES is represented by the associated ESS. In other words, an ESS is a name/identifier associated with a particular ES. Each ESS can be provided as a concatenation of terms representing levels of a graph associated with the ES. As used herein, the term entity is one or more terms that are contained in an enterprise signature. An example ESS can be provided as "EmployeeERPCreateRequestConfirmation," where an example entity includes the term "Employee." In general, ESSs represent technical names that are used to unambiguously identify respective ESs. For example, the ESS can be used as the search criteria, if know to a searching user, to make service retrieval more precise.

In some implementations, graphs associated with ESs can be provided in a knowledge base (e.g., a datastore). In some examples, and as discussed in further detail below, a graph can be provided as a hierarchical graph that represents relationships between terms associated with an ES. In some examples, the knowledge base is provided as a resource description framework (RDF) data store.

In some implementations, an ES can be represented using a graph having associated metadata. In some examples, a graph can be provided as a taxonomic scheme. An example taxonomic scheme can include a software component (SC) node, a deployment unit (DU) node, a process component (PC) node, a communication pattern (CP) node, a direction pattern (DP) node, a business object (BO) node and a business object node (BON) node. In some examples, the business object node (BON) describes parts of the business object that the BON belongs to. As such, the BON can be seen as a property or attribute of the business object. For example, the business object "Sales Order" includes one or more BONs, such as "Item," which is an item that has been purchased as part of the particular sales order. A deployment unit groups process components that interact with each other and that are to be installed together on a system. Deployment units show the type of interactions between process components within the deployment unit. A process component enables governance and understanding the business semantics of ESs in a business process platform.

As noted above, implementations of the present disclosure are directed to entity detection from ESSs, improving the detection of existing, related or new entities to facilitate the creation of a precise and complete knowledge base. Implementations are based on a hybrid solution including an ontology-driven approach to match complete entities and clustering techniques to approximate specializations and new entities. In some examples, clustering techniques are based on cohesion and correlation data, which indicate how many times one or more terms are used with the same entity (cohesion) or other entities (correlation). The hybrid approach is further used to automatically populate a knowledge base and to generate the corresponding automaton, improving the precision and the recall of ES search results.

Figure 1:
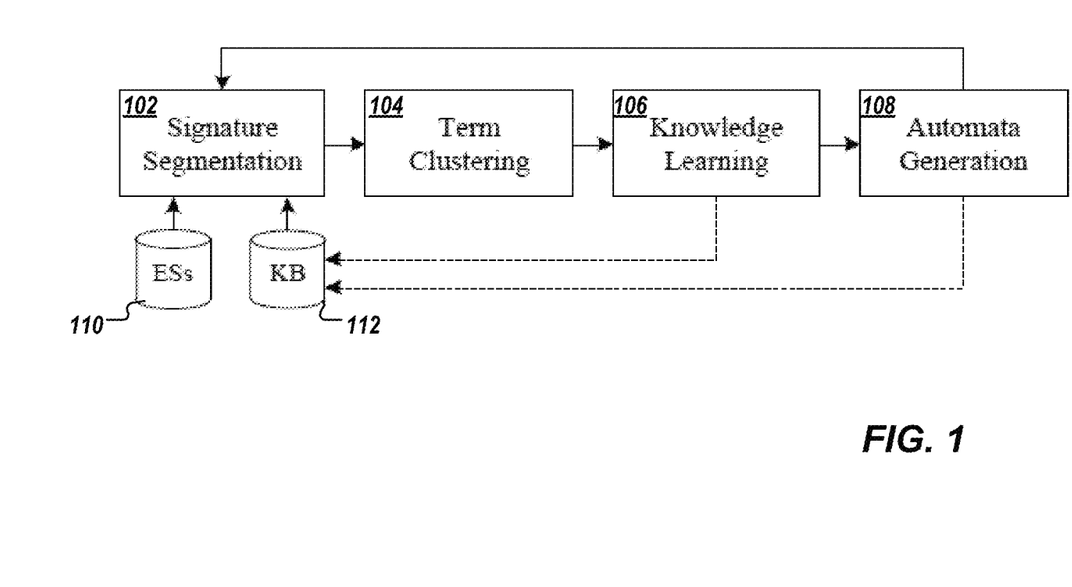
FIG. 1 depicts interactions between example components in accordance with implementations of the present disclosure.

FIG. 1 depicts interactions between example components in accordance with implementations of the present disclosure. In the depicted example, the components include a signature segmentation component 102, a term clustering component 104, a knowledge base learning component 106, an automata generation component 108, an ES repository 110 and a knowledge base (KB) 112. In some examples, components can be provided as one or more computer programs that are executable using one or more processors. In some examples, components can be provided as one or more computer-readable storage devices. Each of the example components is discussed in further detail below.

In some implementations, the signature segmentation component 102 performs signature segmentation, discussed in further detail below, to segment terms provided in an ESS (also referred to as sig). In some examples, the signature segmentation component 102 receives an ESS from the ES repository 110. In some examples, and as discussed in further detail herein, the signature segmentation component 102 splits the ESS into an array of individual terms to identify one or more known terms and one or more unknown terms. In some implementations, the term clustering component 104 can execute term clustering, discussed in further detail below. In some examples, the term clustering component 104 determines relationship measures between unknown terms (provided from the signature segmentation component 102) and already matched entities in an ESS.

In some implementations, the knowledge learning component 106 performs knowledge learning, discussed in further detail below, to identify unknown terms as corresponding to new entities and/or specializations based on the relationship measures. In some examples, the knowledge learning component 106 can interact with the KB 112 to update a graph associated with the ES in view of unknown terms being new entities and/or specializations. In some implementations, the automata generation component 108 performs automata generation, discussed in further detail herein. In some examples, the automata generation component 108 generates an automata corresponding to the ESS in view of unknown terms being new entities and/or specializations. The automata generation component 108 can interact with the KB 112 to store the generated automata therein.

Implementations of the present disclosure are discussed in further detail below with reference to an example ES and an example ESS. It is appreciated, however, that implementations of the present disclosure are readily applicable in other contexts.

Figures 2A, 2B:
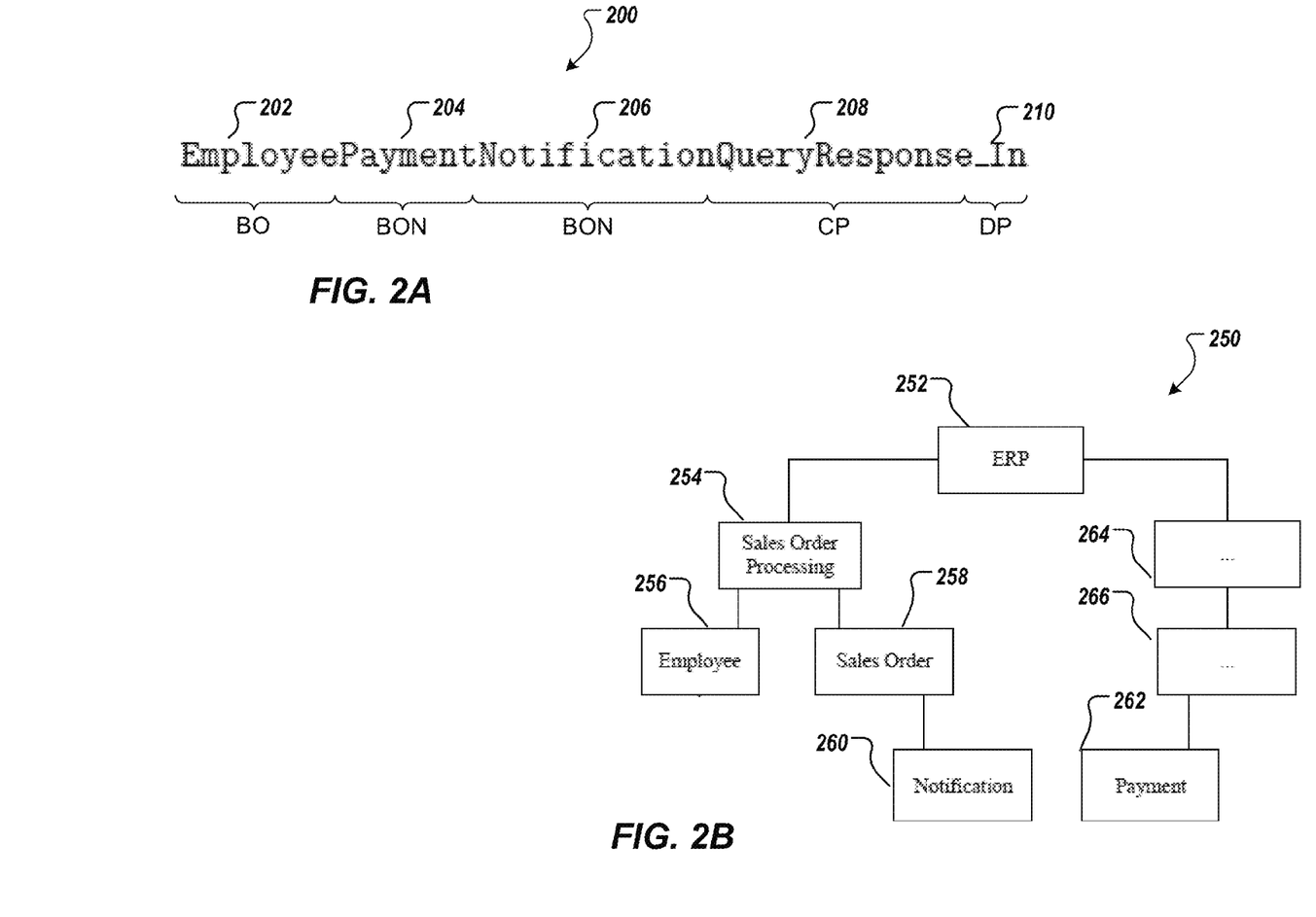
FIG. 2A depicts an example enterprise service signature (ESS).
FIG. 2B depicts an example metadata graph associated with an enterprise service corresponding to the example ESS of FIG. 2A.

Referring now to FIGS. 2A and 2B, an example ESS 200 and an associated metadata graph 250 are respectively depicted. The ESS 200 is provided as a known ESS that includes a plurality of concatenated terms. The terms include: "Employee" 202, "Payment" 204, "Notification" 206, "QueryResponse" 208 and "_In" 210. In the depicted example, each of the terms is provided as a known term and can be identified in view of a taxonomic scheme, such as the example taxonomic scheme discussed above. For example, the term "Employee" 202 can be identified as a BO, the terms "Payment" 204 and "Notification" 206 can be identified as BONs, the term "QueryResponse" 208 can be identified as a CP and the term "_In" 210 can be identified as a DP.

FIG. 2B depicts the example metadata graph 250 associated with an ES corresponding to the example ESS 200 of FIG. 2A. Example metadata can include ERP metadata 252, Sales Order Processing metadata 254, Employee metadata 256, Sales Order metadata 258, Notification metadata 260, and Payment metadata 262. In the depicted example, the metadata graph 250 is provided in a hierarchical tree structure, in which the ERP metadata 252 represents a root node, and the other metadata are children nodes. In particular, the ERP metadata 252 is provided as the parent node to the Sales Order Processing metadata 254 and other, unspecified metadata. The Sales Order Processing metadata 254 is provided as the parent node to the Employee metadata 256 and the Sales Order metadata 258. The Sales Order metadata 258 is provided as the parent node to the Notification metadata 260. The Payment metadata 262 is provided as a child node of other, unspecified metadata (264 and/or 266).

Figure 3:
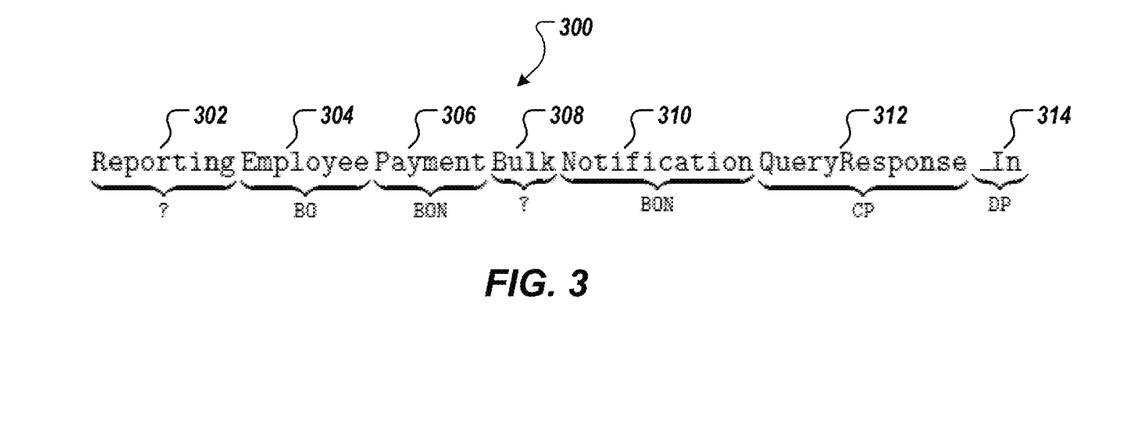
FIG. 3 depicts an example ESS that includes terms not contained in the example metadata graph of FIG. 2B.

In some implementations, an ESS can be provided that includes one or more unknown terms. In some examples, the one or more unknown terms can include terms that cannot be associated with nodes of the taxonomic scheme. FIG. 3 depicts an example ESS 300 that parallels the ESS 200 of FIG. 2A, but includes unknown terms. More particularly, the ESS 300 includes the terms: "Reporting" 302, "Employee" 304, "Payment" 306, "Bulk" 308, "Notification" 310, "QueryResponse" 312 and "_In" 314. The terms "Employee" 304, "Payment" 306, "Notification" 310, "QueryResponse" 312 and "_In" 314 are known terms and can be associated with nodes of the taxonomic scheme (e.g., as discussed above with reference to FIG. 2A). For example, the term "Employee" 304 is identified as a BO, the terms "Payment" 306 and "Notification" 310 are BONs, the term "QueryResponse" 312 is a CP and the term "_In" 314 is a DP. The terms "Reporting" 302 and "Bulk" 308 are unknown terms.

As discussed in further detail herein, and using the example ESSs 200, 300 of FIGS. 2A and 3, respectively, and the example metadata graph 250 of FIG. 2B as non-limiting examples, implementations of knowledge base expansion and automata generation will be discussed in further detail.

Figure 4:
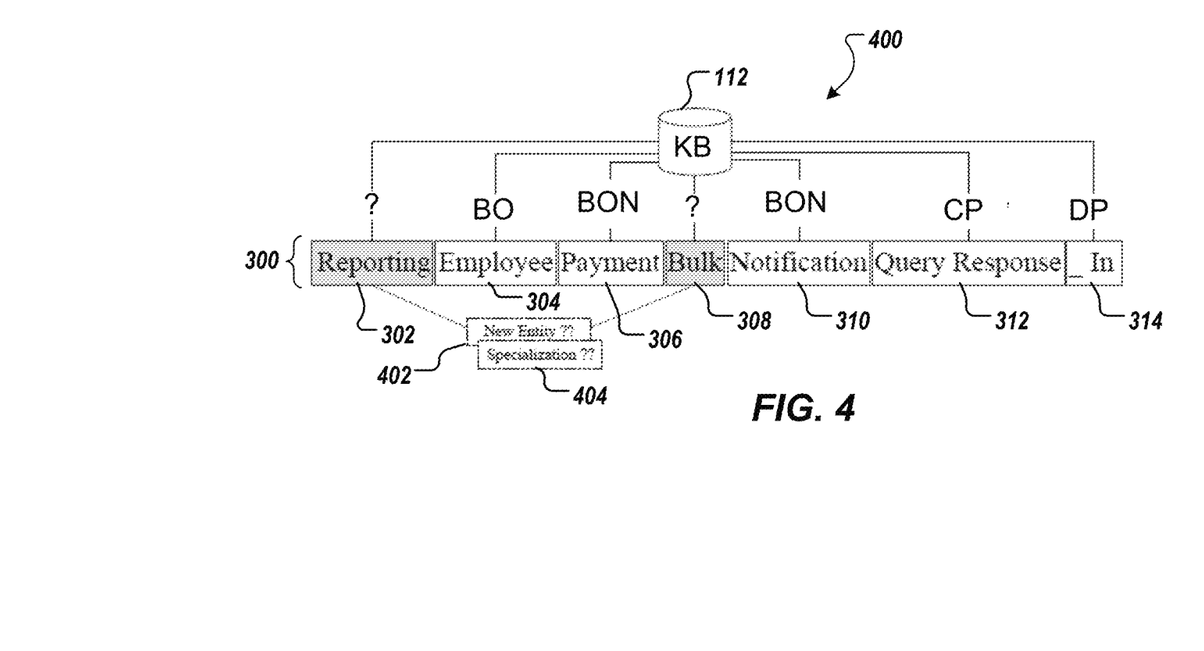
FIG. 4 depicts an example segmentation of the example ESS of FIG. 3.

Referring now to FIG. 4, an ESS, such as the ESS 300, can be received and can include a pre-defined notation. In some examples, ESSs can be provided in camel case notation, where the ESS is provided as a series of terms that are joined together, each term beginning with a capitalized letter. The ESS is segmented to identify individual terms (e.g., using the signature segmentation component 102). For example, the ESS is split into an array of single terms based on the camel case notation. In some examples, subsequent sequences of terms are checked (e.g., against entities provided in the KB 112) to find exact term matches. In some examples, the recursion can return multiple combinations of detected entities for each signature. In such instances, the combination that covers most of the ESS and that has a maximum number of matched entities is selected for further processing. Accordingly, a segmented ESS is provided, which includes one or more terms that represent matched entities (i.e., known terms) and one or more unknown terms. In some examples, the segmented ESS can be considered as a pre-clustering to determine one or more terms that belong together and which form their own cluster as defined by the ontology.

FIG. 4 depicts an example segmentation 400 of the example ESS 300 of FIG. 3. As discussed above, with reference to FIG. 3, the terms "Reporting" 302 and "Bulk" 308 are determined to be unknown terms in view of the information provided in the knowledge base (e.g., the KB 112). As discussed in further detail herein, the unknown terms can be further processed to determine whether each defines a new entity 402 or a specialization 404 of an existing entity.

In some implementations, term clustering is executed (e.g., by the term clustering component 104) to determine the relationship between unknown terms and already matched entities in an ESS. As discussed in further detail herein, term clustering includes the calculation of relationship measures. In some examples, the relationship measures include cohesion values and correlation values between unknown terms and matched entities. As discussed in further detail herein, cohesion and correlation can be used by a ranking function to determine whether an unknown term is a specialization of an existing entity or a completely new entity, or whether no determination can be made.

In accordance with implementations of the present disclosure, the cohesion and correlation values of an unknown term t are determined using the overall occurrence of the term t in a corpus of ESSs (e.g., provided in the ES repository 110). For each term t, the overall occurrence of distinct neighboring entities (preceding and succeeding t), denoted as C(t), in the corpus of ESSs can be determined. With regard to neighboring entities $C_<(t)=\{c_1, \ldots, c_n\}$ denotes the set of distinct entities preceding t and $C_>(t)=\{c_1, \ldots, c_m\}$ represents the set of distinct entities succeeding t, while $C(t)=C_>(t) \cup C_<(t)$ define all neighboring entities.

Example determination of cohesion and correlation values for a term t with entities $c \in C$ will be described in detail. The cohesion $w_{coh}(t,c)$ between a term t and an entity c describes the number of ESSs with pairwise occurrence of t and c compared to all ESSs with occurrences of t. In some implementations the corresponding cohesion value can vary between 0 and 1 (i.e., $w_{coh} \in [0,1]$). In some examples, the cohesion value describes the ratio of term t appearing with entity c and can be defined based on the following example relationship:

$$w_{coh}(t, c) = \frac{|\{t, c\} \subset sig\}|}{|\{t \in sig\}|}$$

In some examples, a maximum cohesion $w_{coh}=1$ indicates that term t has an exclusive relationship to entity c (i.e., that the term t is exclusively associated with the entity c in the corpus of ESSs). In some examples, using only cohesion to determine whether a term is a specialization or a new entity is not sufficient, because cohesion uses all signatures that contain a term t without considering the context of neighboring entities. For example a term may be contained in numerous signatures but with varying occurrences of distinct neighboring entities. As such, a term might have a strong dependency to other clusters, which is expressed by the correlation value.

In some implementations, the correlation $w_{cor}(t,c)$ between a term t and an entity c describes the ratio of the number of distinct entities appearing with a particular term t compared to all ESSs containing that term t. The corresponding value is $w_{cor} \in [0,1]$. The successors can be differentiated from predecessors by considering successive correlations of a term t whenever the cohesion of a term t to an entity c is successive. In a similar manner preceding correlations can be identified. The correlation can be defined based on the following example relationship:

$$w_{cor}(t, c) = \begin{cases} \frac{|C_<(t)|}{|\{t \in sig\}|}, & \text{if } c \in C_< \\ \frac{|C_>(t)|}{|\{t \in sig\}|}, & \text{if } c \in C_> \end{cases}$$

Calculation of example cohesion and correlation values will be described. The example calculation includes the unknown term "Reporting" (see FIGS. 3 and 4). For example, a plurality of ESSs within the corpus of ESSs can include the term t=Reporting. Example ESSs can include:

ReportingLinePeerSimpleByEmployeeQueryResponse_In
ReportingLineManagerSimpleByEmployeeQueryResponse_In
InternalControlIssueSimpleByReportingLineUnitQueryResponse_In
ReportingEmployeeByEmployeeQueryResponse_In Based on the example ESSs, example matched neighboring entities can be determined and can include: $C_<(t)=\{c_1\}=\{By\}$ and $C_>(t)=\{c_2, c_3\}=\{Line, Employee\}$. Using the definition of cohesion and correlation, example occurrences of term t can be determined as:

Occurrences of term t=Reporting: $|\{t \in sig\}|=4$
Occurrences of term t=Reporting and entity $c_3$=Employee: $|\{t, c_3 \in sig\}|=1$
Occurrences of term t=Reporting with distinct successors: $|C_>(t)|=2$
Occurrences of term t=Reporting with distinct predecessors: $C_<(t)=1$ Using the example occurrences of term t, example cohesion $w_{coh}$ and correlation $w_{cor}$ values can be provided as:

$$w_{coh}(t, c_3) = w_{coh}(\text{Reporting, Employee}) = 1/4$$

$$w_{coh}(t, c_3 \in C_>) = w_{cor}(\text{Reporting, Employee}) = 2/4$$

The cohesion and correlation between terms and entities term provide a measure of the relationship therebetween. In some examples, the strength of cohesion and correlation are inversely proportional. For example, a strong cohesion (e.g., signatures containing the same term and entity) typically implies a weak correlation (e.g., few signatures contain the same term but distinct entities) and vice versa. In ambiguous cases, cohesion and correlation can be balanced (e.g., the number of signatures containing the same term and entity is similar to the number of signatures containing the same term and distinct entities).

The determined cohesion and correlation values can be used for knowledge learning (e.g., used by the knowledge learning component 106). For example, knowledge learning functionality can be executed (e.g., by the knowledge learning component 106) to make decisions about unknown terms based on the strength of cohesion and correlation between terms and entities. In some examples, an unknown term can be intuitively identified as a new entity if it is represented by a low cohesion and high correlation. In some examples, an unknown term can be intuitively identified as a specialization if it has a high cohesion but low correlation. In some examples, an unknown term cannot be identified as either a new entity or a specialization.

In some implementations, a ranking function can be used to combine cohesion and correlation values into a single score to identify an unknown term as a new entity or a specialization. In some examples, various ranking functions $\phi$ can be used. In some examples, each ranking function is based on a kernel function $k$, that provides an approximation of the ranking behavior. For example, a kernel function $k(x)$ can show a non-linear function that diverges to min and max values for parameter values close to 0 and 1. An example kernel function can be provided as:

$$k(x) = \frac{1}{2} + \frac{2 \times \left(x - \frac{1}{2}\right)}{\left(1 + \left|x - \frac{1}{2}\right|\right)^2}$$

In some examples, if the kernel function does not plateau around parameters close to 0.5, the kernel function is not ideal because it does not allow pruning of close-to mean values.

Based on the kernel function $\hbar(x)$, a ranking function $\phi(t, c)$ can be provided in view of the cohesion and correlation values for the term t and the entity c. An example ranking function can be provided as:

$$\phi(t,c) = \hbar(w_{coh}(t,c)) - \hbar(w_{cor}(t,c))$$

In some examples, the ranking function produces values $\phi \in [-1,1]$ with $\phi \sim 1$ corresponding to a high cohesion, $\phi \sim -1$ describing a high correlation and $\phi \sim 0$ indicating that there is no significant difference.

In some implementations, the ranking functions $\phi$ are used (e.g., by the knowledge learning component 106) to determine an overall ranking score $\phi_{avg}(t)$ over all neighboring entities as the arithmetic mean. An example overall ranking score is provided based on the following relationship:

$$\varphi_{avg}(t) = \frac{1}{|C(t)|} \sum_{c \in C(t)} \varphi(t, c)$$

The overall ranking score and a defined threshold (e.g., $\rho_{tr} \in [0,1]$) can be used to represent the level of disparity needed to make a decision as to whether to add an unknown term as a specialization, as a new entity, or whether no determination can be made. In some implementations, a decision function $\delta(t)$ can be provided based on the following example relationship:

$$\delta(t) \equiv \begin{cases} \text{specialization,} & \text{if } \varphi_{avg}(t) \geq +\rho_{tr} \\ \text{new utility,} & \text{if } \varphi_{avg}(t) < -\rho_{tr} \\ \text{unknown,} & \text{otherwise} \end{cases}$$

In some examples, the threshold $\rho_{tr}$ can be defined or manually adjusted (e.g., based on user input). In some examples, the threshold $\rho_{tr}$ can be automatically determined based on one or more accumulated sums of occurrence probabilities. The value of the threshold determines the accuracy of the decision function $\delta(t)$ output. For instance, a threshold of $\rho_{tr} \sim 0$ returns a decision with a risk to be wrong whenever cohesion and correlation are closely resembled. Conversely, a threshold of $\rho_{tr} \sim 1$ constitutes the most restrictive threshold, where a decision can only be made if there is maximum cohesion and minimum correlation, and vice versa.

Continuing with the example above (with respect to the unknown term "Reporting"), an example threshold value $\rho_{tr} = 0.3$ can be provided and the average ranking score and decision value can be calculated as follows:

$$\phi(\text{Reporting, Employee}) = \hbar(1/4) - \hbar(2/4) = 0.18 - 0.5 = -0.32$$

$$\phi(\text{Reporting, Line}) = \hbar(3/4) - \hbar(2/4) = 0.82 - 0.5 = 0.32$$

$$\phi_{avg}(\text{Reporting}) = 0 \rightarrow \delta(\text{Reporting}) = \text{unknown}$$

In the given example, although the cohesion for "Reporting" with "Line" and "Employee" is in fact divergent, the result is mitigated because there are, two distinct entities among the four ESSs.

In some implementations, compound terms can be analyzed. For example, terms between matched entities can include one or more terms (e.g., ReceivedBulk), referred to as compound terms. In some implementations, compound terms may represent one or more derived terms or new entities. In some examples, all n-grams of compound terms are considered (e.g., $t_1$=Received, $t_2$=Bulk, and $t_3$=Received Bulk) and the ranking $\phi_{avg}(t_i, c)$ is determined based on neighboring matched entities (e.g., $C_<$={Payment} and $C_>$={Notification}). The n-gram with the highest ranking is saved and the remaining terms are left unknown. After a full iteration over all signatures is completed, another iteration is initiated to address the remaining unknown terms from the previous iteration. Eventually, the process diverges such that the number of unknown terms remains the same, such that no further derived terms or new entities can be found.

Figure 5:
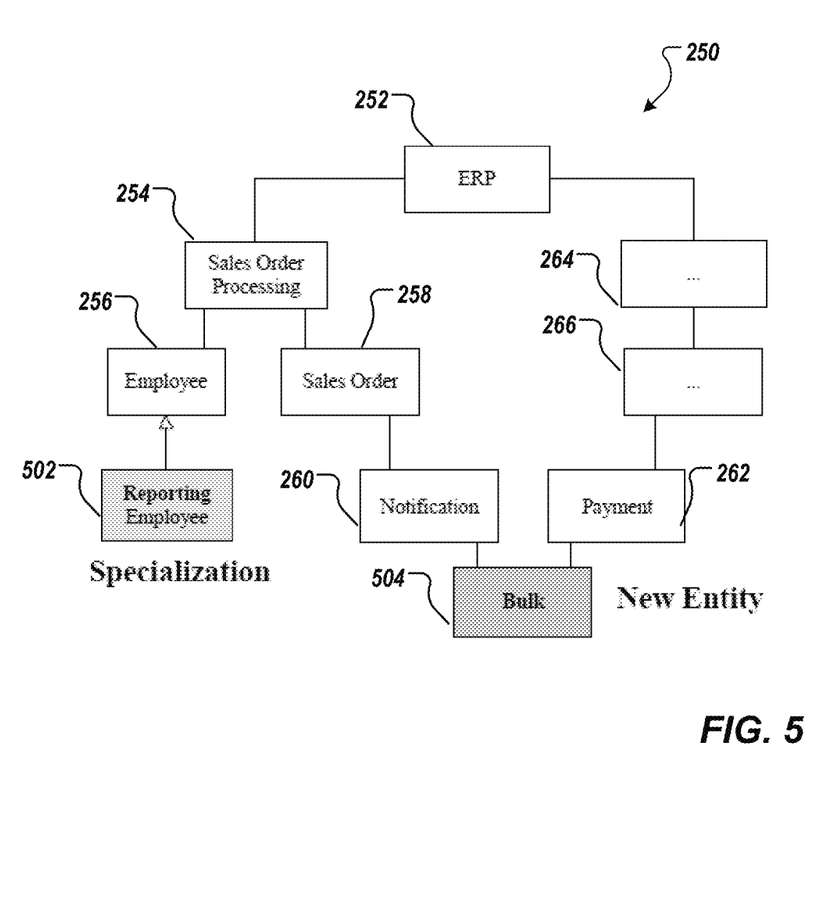
FIG. 5 depicts the example metadata graph of FIG. 2B including example extensions.

Referring now to FIG. 5, the knowledge base can be extended based on decisions as to whether one or more unknown terms define new entities and/or specializations. FIG. 5 depicts the example metadata graph 250 of FIG. 2B including example extensions 502, 504. In some implementations, the metadata graph 250 corresponds to the ESS 300 of FIG. 3 and replicates the known relationships between various terms within the signature. The example extensions 502, 504 correspond to the unknown terms. In the depicted example, it has been determined that the unknown term "Reporting" has a high cohesion, but a low correlation with the known term "Employee." Consequently, the term "Reporting" is determined to be a specialization of the term "Employee" and the metadata graph 250 is extended to include the node 502, reflecting the specialization. In the depicted example, it has been determined that the unknown term "Bulk" has a low cohesion and high correlation with both of the known terms "Notification" and "Payment." Consequently, the unknown term "Bulk" is identified as a new entity related to the terms "Notification" and "Payment," and the metadata graph 250 is extended to include the node 504, reflecting the new entity. The extended metadata graph 250 is stored in the knowledge base (e.g., the KB 112) to improve subsequent ES search results.

Automata generation can be executed (e.g., by the automata generation component 108) to further extend the knowledge base based on the unknown terms that have been identified as specializations or new entities. More particularly, an automata can be generated to describe naming conventions of related ESS. In some implementations, all ESSs that have been completely matched with the knowledge base are referenced. For each ESS, a sequence of entities forming the ES are retrieved and transitions between states of the automata are defined. All entity sequences are consolidated and optimized into a single automaton. Using the extended knowledge base, new transitions for terms identified as specialization and new states are generated, corresponding to new entities. An example automata generation is described with reference to FIGS. 6 and 7.

Figure 6:
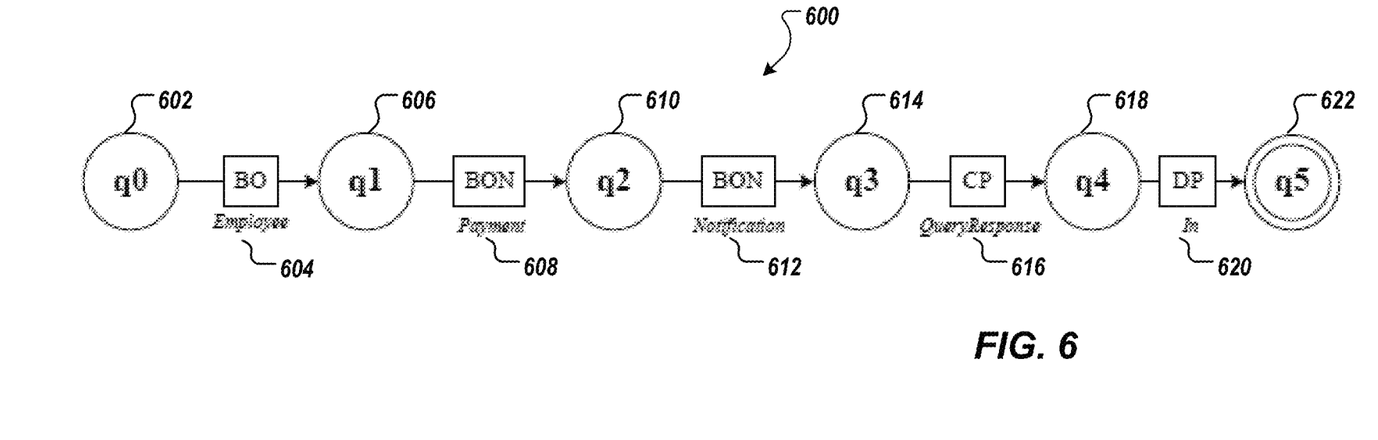
FIG. 6 depicts an example automata based on the example ESS of FIG. 2A.

FIG. 6 depicts an example automata 600 based on the example ESS of FIG. 2A. In some implementations, if the signature can be matched completely with the knowledge base (before clustering) automata generation produces an initial automata that can include, for example, one path having $q_0$ as a start state 602, multiple transitions (604, 608, 612, 616 and 620), intermediate states (606, 610, 614 and 618) and $q_5$ as an end state (622). For example, if the automata 600 is in the start state $q_0$ (602) and the term Employee is detected as being a business object (604), a transition to the following state $q_1$ (606) is triggered. Similarly, the automata 600 can transition to the successive states until it reaches the end state $q_5$ (622). For example, if the automata 600 is in the state $q_2$ (610) and the term Notification is detected as being a business object node (612), a transition to the following state $q_3$ (614) is triggered. When the automata 600 reaches the end state $q_5$ (622), the ESS is deemed to be compliant. An ESS is deemed to be compliant if the ESS complies to the design guidelines and naming conventions defined as part of an applied governance process.

Figure 7:
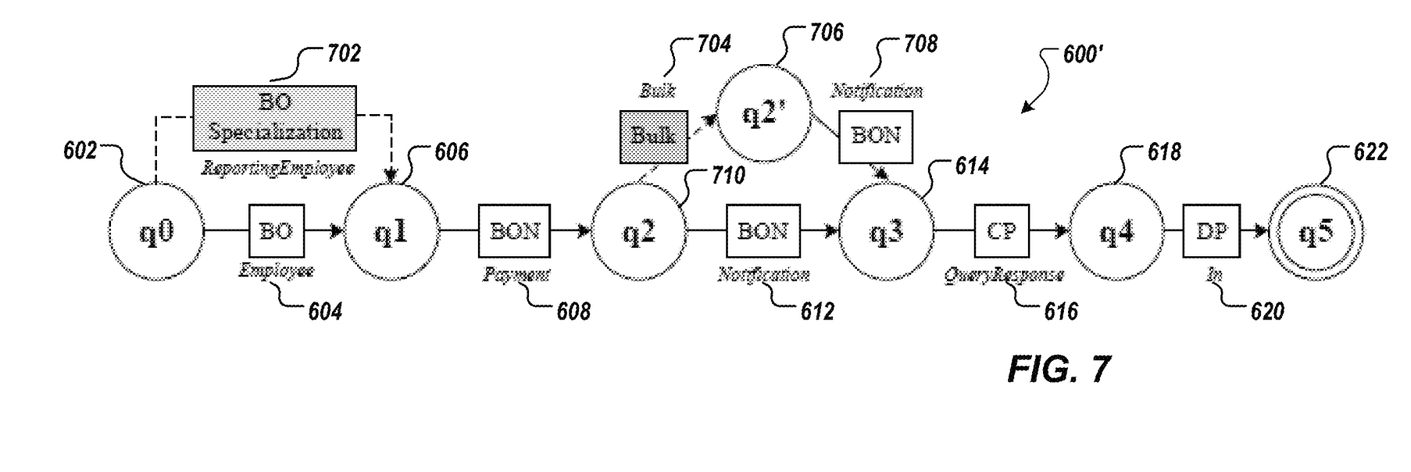
FIG. 7 depicts the example automata of FIG. 6 including extensions based on the example ESS of FIG. 3.

FIG. 7 depicts an extended automata 600' based on the example automata 600 of FIG. 6. Example extensions based on the example ESS 300 of FIG. 3 are included, as discussed below. Using the extended knowledge base, a new transition (702) is provided for the term Reporting Employee, which was identified as a specialization, as discussed above. In some examples, if the automata 600' is in the start state $q_0$ (602) and the term Employee or the term Reporting Employee is detected, a transition to the following state $q_1$ (606) is triggered. Using the extended knowledge base, a new state $q_2'$ (706) for the term Bulk is provided, which was identified as being a new entity. A transition (704) from the state $q_2$ and a transition (708) to the state $q_3$ (614) are provided. For example, if the automata 600' is in the state $q_2$ (610) and the term Bulk is detected, the transition (704) to the new state $q_2'$ (706) is triggered. If the automata 600' is in the state $q_2$ (610) or the state $q_2'$ (706) and the term Notification is detected, a transition to the state $q_3$ (614) is triggered. If the extended automata 600' reaches the end state $q_5$ (622), the ESS is deemed to be compliant.

Figure 8:
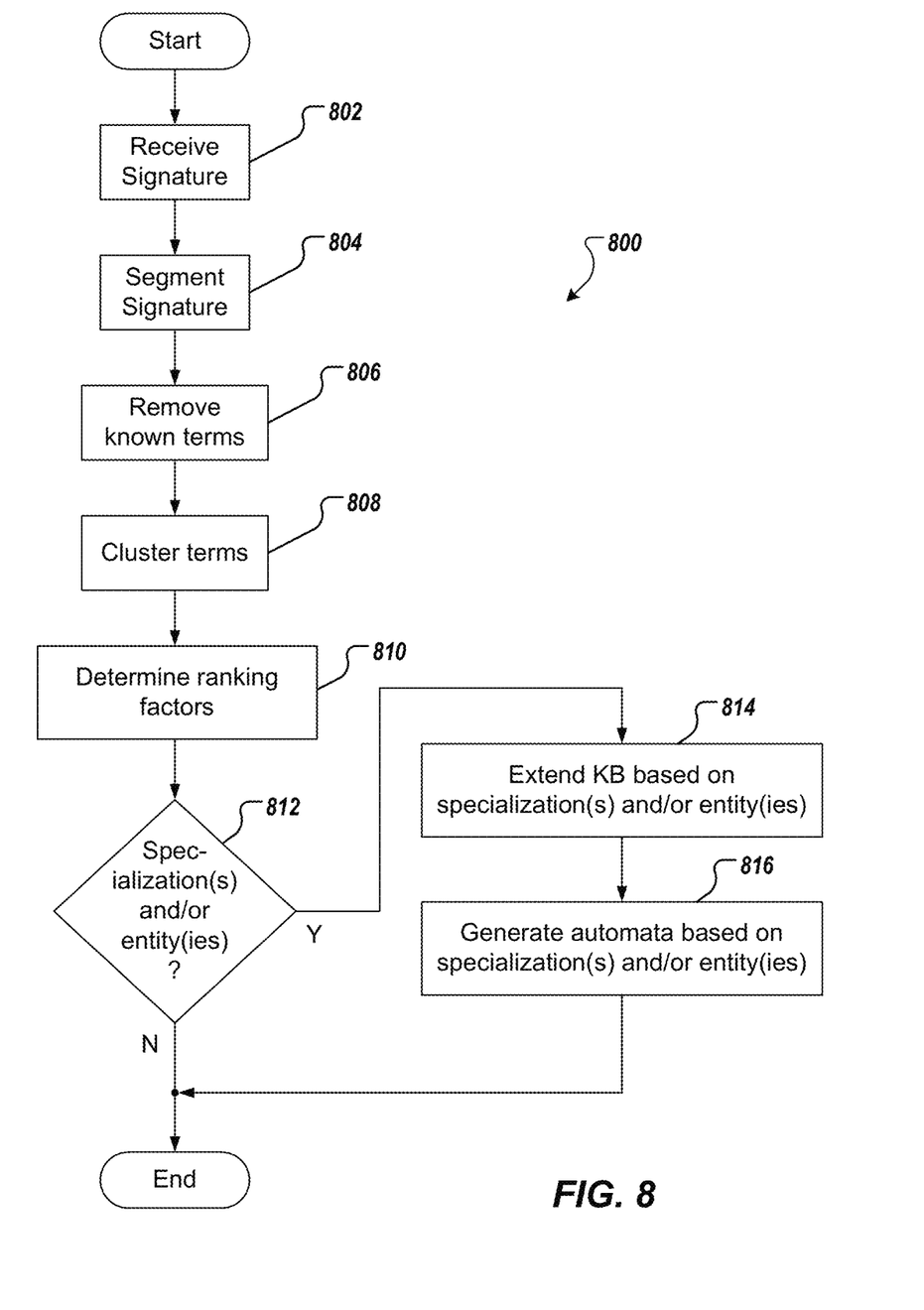
FIG. 8 depicts an example process that can be executed in implementations of the present disclosure.

FIG. 8 depicts an example process 800 that can be executed in implementations of the present disclosure. In some implementations, the example process 800 can be provided using one or more computer programs executed using one or more computing devices.

A signature (ESS) is received (802). For example, the signature segmentation component 102 of FIG. 1 can receive a signature of the ES repository 110. The signature is segmented (804). For example, the signature segmentation component 102 can process the signature to identify known terms (e.g., already existing in the knowledge base) and unknown terms. If unknown terms are provided, known terms are removed (806). For example, the signature segmentations component 102 only provides the known terms as output. The unknown terms are clustered (808). For example, the term clustering component 104 of FIG. 1 can receive the unknown terms from the signature segmentation component 102 and can perform term clustering based on cohesion and correlation values, as discussed in detail above. In some implementations, in order to make accurate decisions about unknown terms based on cohesion and correlation values, ranking factors are determined (810). It is determined whether one or more of the unknown terms is identified as a specialization or a new entity (812). For example, the term clustering component 104 can identify unknown terms as specializations or new entities based on the ranking functions, as discussed in detail above. If one or more unknown terms have been identified as a specialization or a new entity, the knowledge base is extended based on the unknown terms (814). In some examples, the knowledge learning component 106 of FIG. 1 extends the knowledge base by, for example, adding new nodes to an associated metadata graph, each new node representing a new entity or a specialization associated with an unknown term. An automata is generated based on the new entity(ies) and/or specialization(s) (816). For example, the automata generation component 108 of FIG. 1, generates an extended automata, as discussed above with reference to FIGS. 6 and 7.

Figure 9:
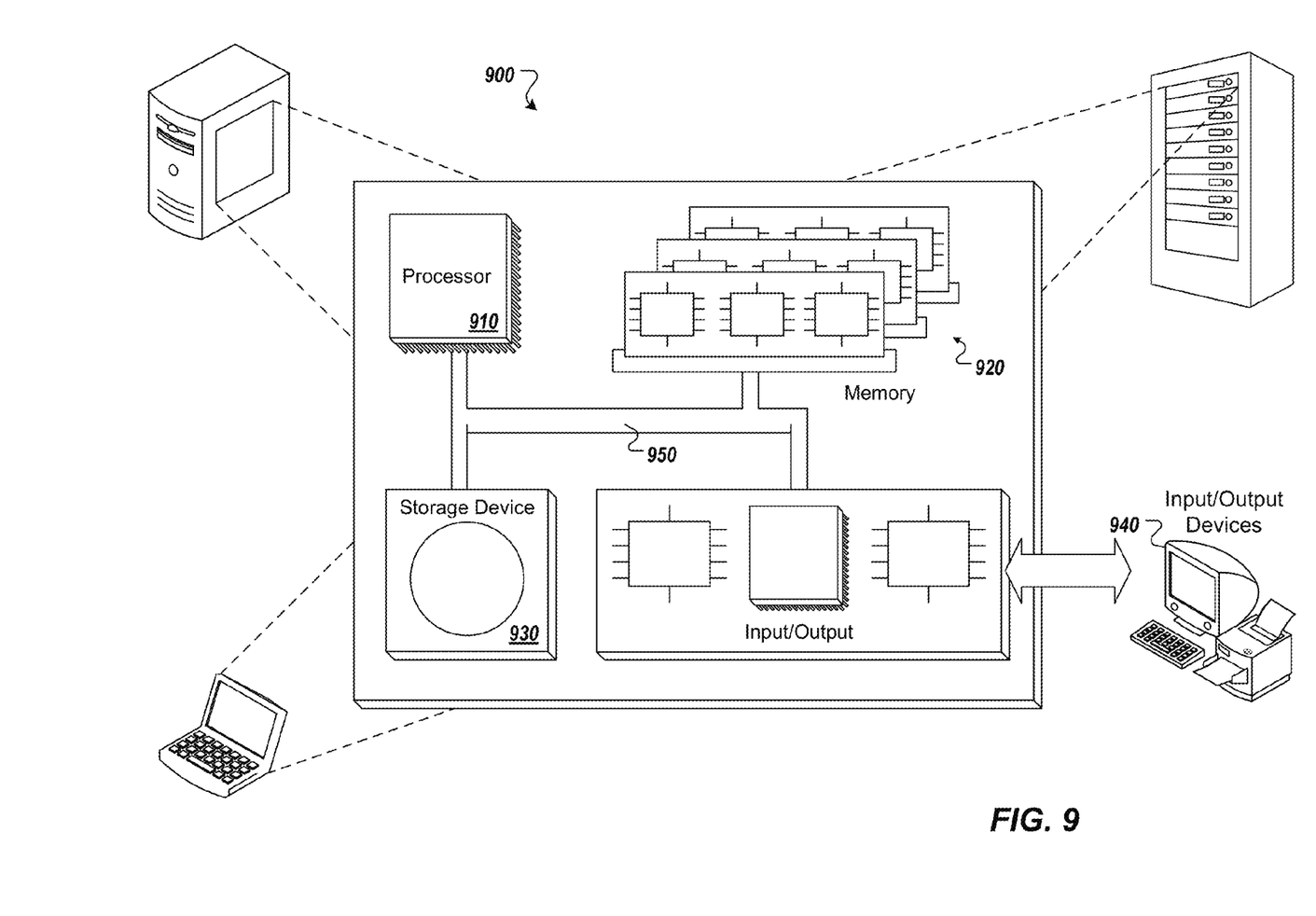
FIG. 9 is a schematic illustration of example computer systems that can be used to execute implementations of the present disclosure.

Referring now to FIG. 9, a schematic diagram of an example computing system 900 is provided. The system 900 can be used for the operations described in association with the implementations described herein. For example, the system 900 may be included in any or all of the server components discussed herein. The system 900 includes a processor 910, a memory 920, a storage device 930, and an input/output device 940. Each of the components 910, 920, 930, and 940 are interconnected using a system bus 950. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930 to display graphical information for a user interface on the input/output device 940.

The memory 920 stores information within the system 900. In one implementation, the memory 920 is a computer-readable medium. In one implementation, the memory 920 is a volatile memory unit. In another implementation, the memory 920 is a non-volatile memory unit. The storage device 930 is capable of providing mass storage for the system 900. In one implementation, the storage device 930 is a computer-readable medium. In various different implementations, the storage device 930 may be a floppy disk device, a hard disk device, an optical disk device, or a tape device. The input/output device 940 provides input/output operations for the system 900. In one implementation, the input/output device 940 includes a keyboard and/or pointing device. In another implementation, the input/output device 940 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor receives instructions and data from a read-only memory or a random access memory or both. The essential elements of a computer are a processor for executing instructions and one or more memories for storing instructions and data. Generally, a computer also includes, or is operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for extending a knowledge base, the method being executed using one or more processors and comprising: receiving an enterprise service signature (ESS) associated with an enterprise service (ES), the ESS being stored in a computer-readable repository, the ES comprising a callable service that provides business functionality, the ESS identifying the ES and comprising a concatenation of terms and a notation; segmenting, by the one or more processors, the ESS based on the notation to provide a segmented ESS comprising an array of terms; comparing, by the one or more processors, terms of the array of terms to metadata of a taxonomic scheme, the metadata comprising one or more neighboring entities of a respective term in the array of terms; identifying, by the one or more processors and based on the comparing, one or more known terms and one or more unknown terms from the segmented ESS, the one or more known terms matching the taxonomic scheme and the one or more unknown terms not being associated with the taxonomic scheme; determining, by the one or more processors, that at least one unknown term of the one or more unknown terms comprises at least one of a specialization and a new entity based on combining a cohesion value and a correlation value, the cohesion value being based on a number of times the at least one unknown term is used with one of the one or more known terms and the correlation value being based on a number of times the at least one unknown term is used with other known terms; and extending, by the one or more processors, the knowledge base in view of the at least one of the specialization and the new entity.

2. The method of claim 1, wherein determining that the at least one unknown term comprises at least one of a specialization and a new entity comprises:
determining one or more relationship measures associated with the at least one unknown term; and
identifying the at least one unknown term as a specialization or a new entity.

3. The method of claim 2, wherein the relationship measures comprise the cohesion value and the correlation value.

4. The method of claim 2, wherein the relationship measures are each determined based on known terms associated with one or more other ESSs.

5. The method of claim 3, wherein identifying the at least one unknown term as a specialization or a new entity comprises:
combining the cohesion value and the correlation value into a single score based on a ranking function; and
comparing the single score to one or more threshold scores, wherein whether the at least one unknown term is a specialization or a new entity is based on the comparing.

6. The method of claim 5, wherein combining the cohesion value and the correlation value into a single score is further based on a kernel function, the kernel function providing an approximation of ranking behavior.

7. The method of claim 1, wherein extending the knowledge base comprises appending one or more nodes to a metadata graph associated with the ES.

8. The method of claim 1, wherein extending the knowledge base comprises automatically generating an automata based on the at least one unknown term, the automata representing a naming convention of an ES.

9. The method of claim 8, wherein the at least one unknown term is a specialization and automatically generating the automata comprises appending a new transition to a pre-defined automata.

10. The method of claim 9, wherein the new transition is appended to be parallel to an existing transition provided in the pre-defined automata.

11. The method of claim 8, wherein the at least one unknown term is a new entity and automatically generating the automata comprises appending a new state and one or more associated transitions to a pre-defined automata.

12. The method of claim 11, wherein the new state is appended to be serial to one or more existing states provided in the pre-defined automata.

13. A non-transitory computer-readable storage medium coupled to one or more processors and having instructions stored thereon which, when executed by the one or more processors, cause the one or more processors to perform operations for extending a knowledge base, the operations comprising: receiving an enterprise service signature (ESS) associated with an enterprise service (ES), the ESS being stored in a computer-readable repository, the ES comprising a callable service that provides business functionality, the ESS identifying the ES and comprising a concatenation of terms and a notation; segmenting the ESS based on the notation to provide a segmented ESS comprising an array of terms; comparing terms of the array of terms to metadata of a taxonomic scheme, the metadata comprising one or more neighboring entities of a respective term in the array of terms; identifying based on the comparing, one or more known terms and one or more unknown terms from the segmented ESS, the one or more known terms matching the taxonomic scheme and the one or more unknown terms not being associated with the taxonomic scheme; determining that at least one unknown term of the one or more unknown terms comprises at least one of a specialization and a new entity based on combining a cohesion value and a correlation value, the cohesion value being based on a number of times the at least one unknown term is used with one of the one or more known terms and the correlation value being based on a number of times the at least one unknown term is used with other known terms; and extending the knowledge base in view of the at least one of the specialization and the new entity.

14. A system, comprising: a computing device; and a computer-readable storage device coupled to the computing device and having instructions stored thereon which, when executed by the computing device, cause the computing device to perform operations for extending a knowledge base, the operations comprising: receiving an enterprise service signature (ESS) associated with an enterprise service (ES), the ESS being stored in a computer-readable repository, the ES comprising a callable service that provides business functionality, the ESS identifying the ES and comprising a concatenation of terms and a notation; segmenting the ESS based on the notation-to provide a segmented ESS comprising an array of terms; comparing terms of the array of terms to metadata of a taxonomic scheme, the metadata comprising one or more neighboring entities of a respective term in the array of terms; identifying based on the comparing, one or more known terms and one or more unknown terms from the segmented ESS, the one or more known terms matching the taxonomic scheme and the one or more unknown terms not being associated with the taxonomic scheme; determining that at least one unknown term of the one or more unknown terms comprises at least one of a specialization and a new entity based on combining a cohesion value and a correlation value, the cohesion value being based on a number of times the at least one unknown term is used with one of the one or more known terms and the correlation value being based on a number of times the at least one unknown term is used with other known terms; and extending the knowledge base in view of the at least one of the specialization and the new entity.

* * * * *